(12) United States Patent
Koumura et al.

(10) Patent No.: US 7,178,748 B2
(45) Date of Patent: Feb. 20, 2007

(54) METHOD OF RECYCLING PLASTIC MATERIAL OF PROCESS CARTRIDGE

(75) Inventors: Noboru Koumura, Ibaraki (JP); Nagatoshi Konno, Ibaraki (JP); Seiichi Kato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 10/717,479

(22) Filed: Nov. 21, 2003

(65) Prior Publication Data

US 2004/0250399 A1    Dec. 16, 2004

(30) Foreign Application Priority Data

Nov. 26, 2002  (JP)  ............... 2002-342307

(51) Int. Cl.
  B02C 23/14  (2006.01)
  B02C 23/10  (2006.01)
  B02C 23/16  (2006.01)
  B02C 23/08  (2006.01)

(52) U.S. Cl. .............. 241/24.14; 241/12; 241/13; 241/18; 241/28

(58) Field of Classification Search ............ 241/24.12, 241/24.13, 24.14, 24.15, 24.18, 24.28
See application file for complete search history.

(56) References Cited

U.S. PATENT DOCUMENTS 5,143,308 A * 9/1992 Hally et al. .............. 241/76
5,257,740 A * 11/1993 Prew et al. .............. 241/20
6,311,904 B1 * 11/2001 Leturmy et al. .......... 241/18
6,568,612 B1 * 5/2003 Aoki et al. ............... 241/19
6,588,597 B2 * 7/2003 Arakane et al. .......... 209/4
2002/0064394 A1   5/2002 Higeta et al. ............ 399/113
2003/0183705 A1 * 10/2003 Christiani et al. ....... 241/23
2003/0192969 A1  10/2003 Koumura et al. ........ 241/18

FOREIGN PATENT DOCUMENTS

| JP | 5-301222   | 11/1993 |
| JP | 9-150137   | 6/1997  |
| JP | 9-206685   | 8/1997  |
| JP | 11-156224  | 6/1999  |
| JP | 2000-159900| 6/2000  |
| JP | 2001-205245| 7/2001  |

* cited by examiner

*Primary Examiner*—Lowell A. Larson
*Assistant Examiner*—Jason Y. Pahng
(74) *Attorney, Agent, or Firm*—Fitzpatrick, Cella, Harper & Scinto

(57) ABSTRACT

It is an object of this invention to efficiently recycle a plastic resin material used in a process cartridge. To achieve this object, in a method of recycling a plastic material of a process cartridge, the process cartridge is crushed in a crushing step while particles such as toner are collected by suction, particles including toner are further separated in a screening step, metal materials are separated in a magnetic selection step, a drum magnetic selection step, and an eddy current step, particles including toner and foreign matter are separated in an air selection step, a secondary crushing step, a peeling step, and a dry gravity separation step, and a plastic material having a specific density is separated in a color selection step.

3 Claims, 9 Drawing Sheets

FIG. 6
STEP 10
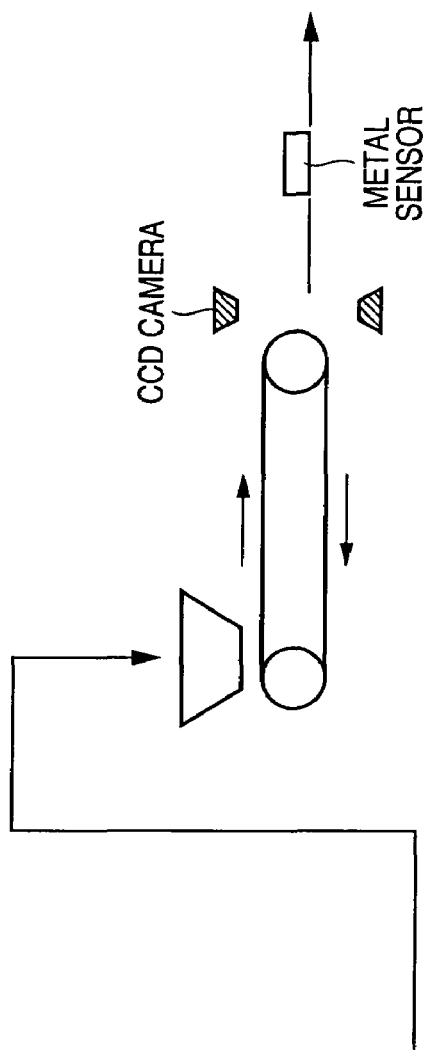
COLOR SELECTION STEP
STEP 9
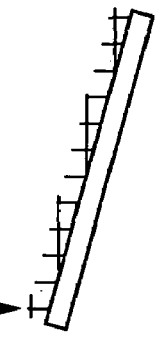
CONTINUED FROM FIG. 5
DRY GRAVITY SEPARATION STEP

FIG. 8

| PLASTIC REFLECTION DENSITY MEASUREMENT RESULTS | | | | |
|---|---|---|---|---|
| COLOR | MATERIAL | REFLECTION DENSITY | | |
| | | MIN | MAX | AV |
| BLACK 1 | HIPS | 1.5 | 1.59 | 1.54 |
| BLACK 2 | HIPS | 1.55 | 1.66 | 1.62 |
| BLACK 3 | HIPS | 1.31 | 1.5 | 1.4 |
| GRAY 1 | HIPS | 1.21 | 1.37 | 1.29 |
| BLUE 1 | PP | 0.53 | 0.68 | 0.58 |
| GREEN 1 | PP | 0.54 | 0.64 | 0.59 |
| VERMILION 1 | ABS | 0.5 | 0.55 | 0.52 |
| MILK WHITE 1 | POM. | 0.37 | 0.41 | 0.39 |
| MILK WHITE 2 | POM | 0.22 | 0.32 | 0.25 |

FIG. 9

| MEASUREMENT APPARATUS : Macbeth RD914 ( MONOCHROME MODE ) | | |
|---|---|---|
| TEST ITEMS | A | B |
| GRAVITY | 1.12 | 1.11 |
| MI (g / 10min) | 4.1 | 4.1 |
| TENSILE BREAK STRENGTH (Mpa) | 26 | 25 |
| BENDING STRENGTH (Mpa) | 43 | 44 |
| IZOD IMPACT STRENGTH (KJ / m$^2$) | 8 | 7.5 |
| FLAMMABILITY | V–2 | V–2 |
| SHRINKAGE FACTOR 200mm (%) | 0.59 | 0.58 |

METHOD OF RECYCLING PLASTIC MATERIAL OF PROCESS CARTRIDGE

FIELD OF THE INVENTION

The present invention relates to a method of recycling plastic materials forming a process cartridge.

The present invention particularly relates to a method of recycling a specific plastic material from plastic materials forming a process cartridge.

The present invention further relates to a method of recycling a plastic material having a predetermined reflection density from plastic materials forming a process cartridge.

In this specification, a process cartridge is a product made up of parts and materials required for image formation, e.g., a photosensitive drum, charger, cleaner, and toner, and detachably incorporated into a copying machine or printer.

BACKGROUND OF THE INVENTION

Japanese Patent Laid-Open No. 09-150137 is prior information concerning a method of discarding a unit containing toner.

To crush and pulverize a cartridge containing toner, a measure to counter a dust explosion caused by toner is necessary. One countermeasure is Japanese Patent Laid-Open No. 11-156224.

Also, Japanese Patent Laid-Open Nos. 05-301222 and 2000-159900 are inventions pertaining to the reuse of thermoplastic resins used in products such as copying machines, printers, facsimile apparatuses, and television sets.

Japanese Patent Laid-Open No. 2001-205245 is an invention related to a process of separating toner from a used process cartridge.

Furthermore, Japanese Patent Laid-Open No. 09-206685 is an invention concerning particle processing.

Image forming apparatuses, such as copying machines and laser beam printers, have rapidly spread with the progress of information communication technologies and the development of information communication apparatuses. Also, old apparatuses are extensively replaced with new ones as new products are developed.

In addition, old types of products are largely collected when they are replaced with new ones.

Methods of collecting and recycling household electric appliances, such as television sets and refrigerators, are established by the enforcement of the Household Electric Appliance Recycling Law. However, it is difficult to collect toner remaining in cartridges used in image forming apparatuses, particularly, printers and copying machines.

That is, to recycle cartridges, toner must be initially removed manually, and this increases the recycling cost.

On the other hand, if cartridges are crushed by a crusher without removing toner, the toner and some other particles scatter in a crushing vessel.

In addition, sparks generated when metal parts, such as agitating bars, developing blades, and sleeves, inside these cartridges are crushed by the crusher may function as ignition sources and induce a dust explosion.

Also, when cartridges are crushed and individual materials are selectively collected, toner strongly adheres to these materials.

Even if iron, aluminum, stainless steel, plastics, seals, and paper are separately removed and a specific material forming process cartridges is selected via several selecting steps, such as a screening step, a magnetic selection step, an air selection step, and a gravity selection step, after a crushing step, toner strongly adheres to the selected material. The adhered toner cannot be easily removed because the toner is charged and electrically sticks to the material.

If this recycled material to which the toner sticks is directly used as a molding material of a cartridge, the external appearance of the molded product declines, or the strength and/or the fire resistance of the molded material decreases.

As described above, a material which behaves as foreign matter with respect to a plastic material selected as a recycled material or a material which undesirably alters physical properties must be removed as much as possible.

It is possible to crush process cartridges in a crushing step and separate only plastic materials via a metal selecting means, such as one using magnetic selection, and a different material selecting means, such as one using gravity selection.

Furthermore, toner can be separated from plastic materials by introducing an apparatus using a cleaning device.

It is, however, difficult to select a specific plastic material from different types of plastic materials subjected to the cleaning step.

SUMMARY OF THE INVENTION

It is a principal object of the present invention to separate a specific plastic material from plastic materials (e.g., HIPS) of a process cartridge, and mold this specific plastic material into a cartridge again. However, if a different plastic material is mixed in the separated plastic material, the flow characteristics of a resin material may change during molding to make the molding process difficult, or the strength of the cartridge may decrease.

Furthermore, if the separated plastic material has a different color, the color of the molded cartridge changes, and the color uniformity is lost.

To solve this problem of the color uniformity, a color adjustment step must be performed for plastic pellets of the recycled material. Since this step increases the recycling cost, the method does not satisfy the objective of minimizing costs when a recycled plastic material is used.

When plastic materials which are subjected to a cleaning step and to which toner is sticking are selected in a plastic selection step, different plastic materials adhere to each other under the influence of water or the cleaner used.

Many plastic materials have relatively close specific gravities. Therefore, no specific plastic material can be separated with high purity only by gravity selection.

To solve the above problems and achieve an object of the invention, a method of recycling a plastic material of a process cartridge is provided according to the present invention, wherein the process cartridge is crushed in a crushing step while particles, such as toner, are collected by suction, particles including toner are further removed in a screening step, metal materials are removed in a magnetic selection step, a drum magnetic selection step, and an eddy current step, particles including toner and foreign matter are removed in an air selection step, a secondary crushing step, a peeling step, and a gravity separation step, and the remaining materials are conveyed to a color selection step by a conveyor means to separate a plastic material having a reflection density of 1.00 or more.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining steps;

FIG. 8 is a table showing the results of measurements of the reflection densities of crushed pieces in embodiments; and FIG. 9 is a table showing the results of comparison of test items performed for HIPS molded portions of resin materials of process cartridges, i.e., performed for process cartridge parts molded by new HIPS and process cartridge parts molded by using recycled HIPS selected by a plastic material recycling method according to the present invention.

DETAILED DESCRIPTION OF THE PREFERRED EMBODIMENTS

Preferred embodiments of the present invention will now be described in detail in accordance with the accompanying drawings.

Figure 1:
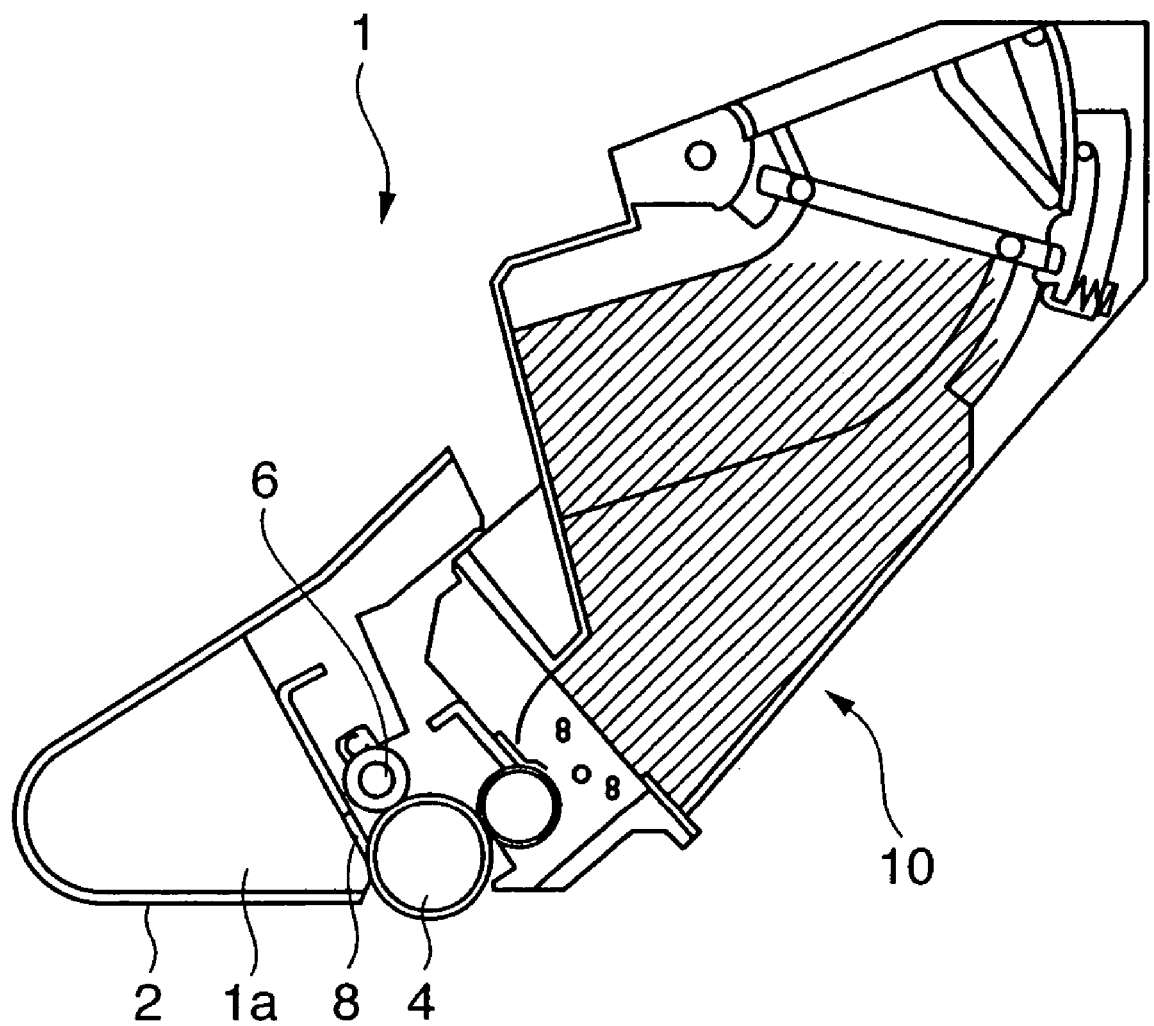
FIG. 1 is a sectional view of a process cartridge used in embodiments of the present invention.

FIG. 1 is a sectional view for explaining a process cartridge to which the present invention is applied.

A process cartridge 1 is made up of a plastic vessel 2 as a main body, and a photosensitive drum 4, a charging roller 6, a cleaning blade 8, and a developing sleeve 10 assembled in the vessel 2.

The vessel 2 forms a toner container 1a which contains toner scraped off from the photosensitive drum 4 during a development process. The photosensitive drum 4 is formed by coating the surface of an aluminum drum with a photosensitive material. A driving gear made of plastic is attached to a drum end portion.

The charging roller 6 is formed by molding a rubber roller on an iron shaft.

The cleaning blade 8 is obtained by fixing a rubber blade plate to an iron base.

The developing sleeve 10 is made of aluminum and contains a magnet.

This process cartridge is made of metal materials, such as iron, aluminum, and stainless steel (SUS), and various other materials, such as rubber materials, plastic materials, and tape materials.

Figure 2:
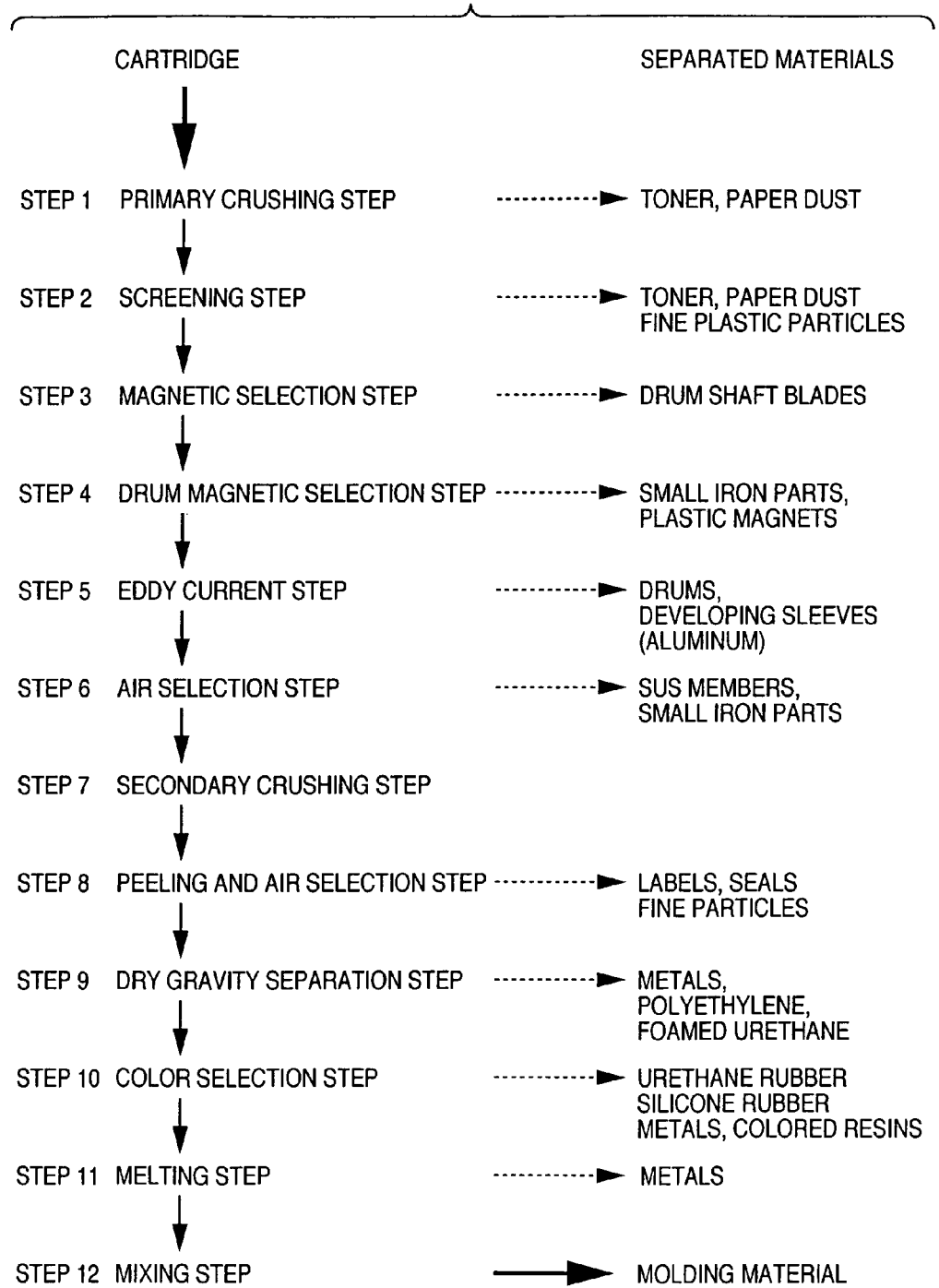
FIG. 2 is a view showing steps used in embodiments of the present invention.

FIG. 2 shows a process of recycling a plastic material of the process cartridge according to the present invention into a recycled plastic material.

The process of this embodiment will be explained below with reference to FIG. 2.

In step 1 of FIG. 2, collected process cartridges are crushed while toner is collected by suction (a primary crushing step).

Figure 3:
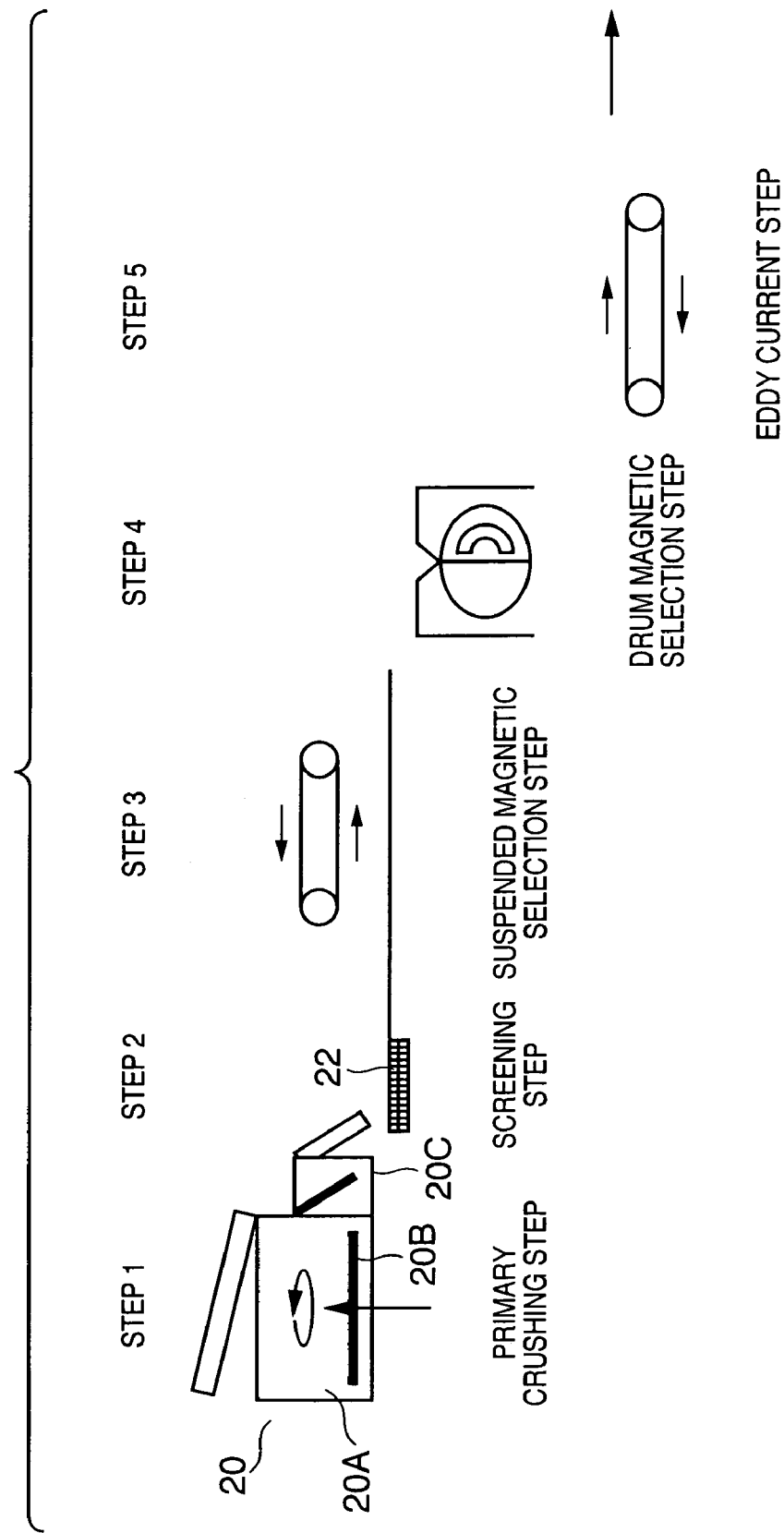
FIG. 3 is a view for explaining steps.

FIG. 3 shows means and apparatuses from the primary crushing step in step 1 to an eddy current selection step in step 5 shown in FIG. 2.

Step 1 shown in FIG. 3 shows an outline of the structure of a crushing apparatus 20 used in the crushing step.

In the crushing apparatus 20, a rotary blade 20B is placed in a steel vessel 20A.

A predetermined amount (number) of process cartridges containing toner are placed in the crushing vessel. When the rotary blade is rotated by a driving means, these cartridges are flung up by the rotary blade and crushed as they are thrown against the circumferential wall of the vessel.

Since the cartridges placed in the vessel contain toner and paper dust, sparks generated by the collision of the metal members of the cartridges against the circumferential wall of the vessel may induce a dust explosion. Therefore, during this crushing and suction operation, an inert gas, such as nitrogen gas, is supplied into the vessel 20A to maintain the oxygen concentration in the vessel at a predetermined concentration or less (10% or less).

The rotational speed of the rotary blade and the crushing time can be set in accordance with the type of process cartridge.

A suction chamber 20C is formed adjacent to the crushing vessel 20A. The crushed product of the cartridges crushed by the crushing vessel 20A is supplied into the suction chamber 20C. An impacting means applies impact to the crushed product to float toner sticking to the crushed product. A suction means collects the floated toner by suction.

The process up to this point is the primary crushing step.

The purpose of step 1 is to separate toner and paper dust.

A screen selection step in step 2 of FIG. 3 shows a selection step using a shaking screen.

The crushed product subjected to the impacting process and suction process in the suction chamber 20C is then subjected to a selecting operation by a shaking screen selecting means 22.

In step 2, toner, paper dust, and fine particles of plastic materials produced in the crushing step are separated.

Step 3 shows a metal selection step in which a magnetic selecting means selects iron members from the crushed product subjected to the shaking screen selection step. In step 3, cleaning blades and drum shafts are separated.

Step 4 uses a drum magnetic selecting means. In step 4, small iron parts and plastic magnets are separated.

In step 5, aluminum members such as drums and developing sleeves are selected by an eddy current selecting means.

Figure 4:
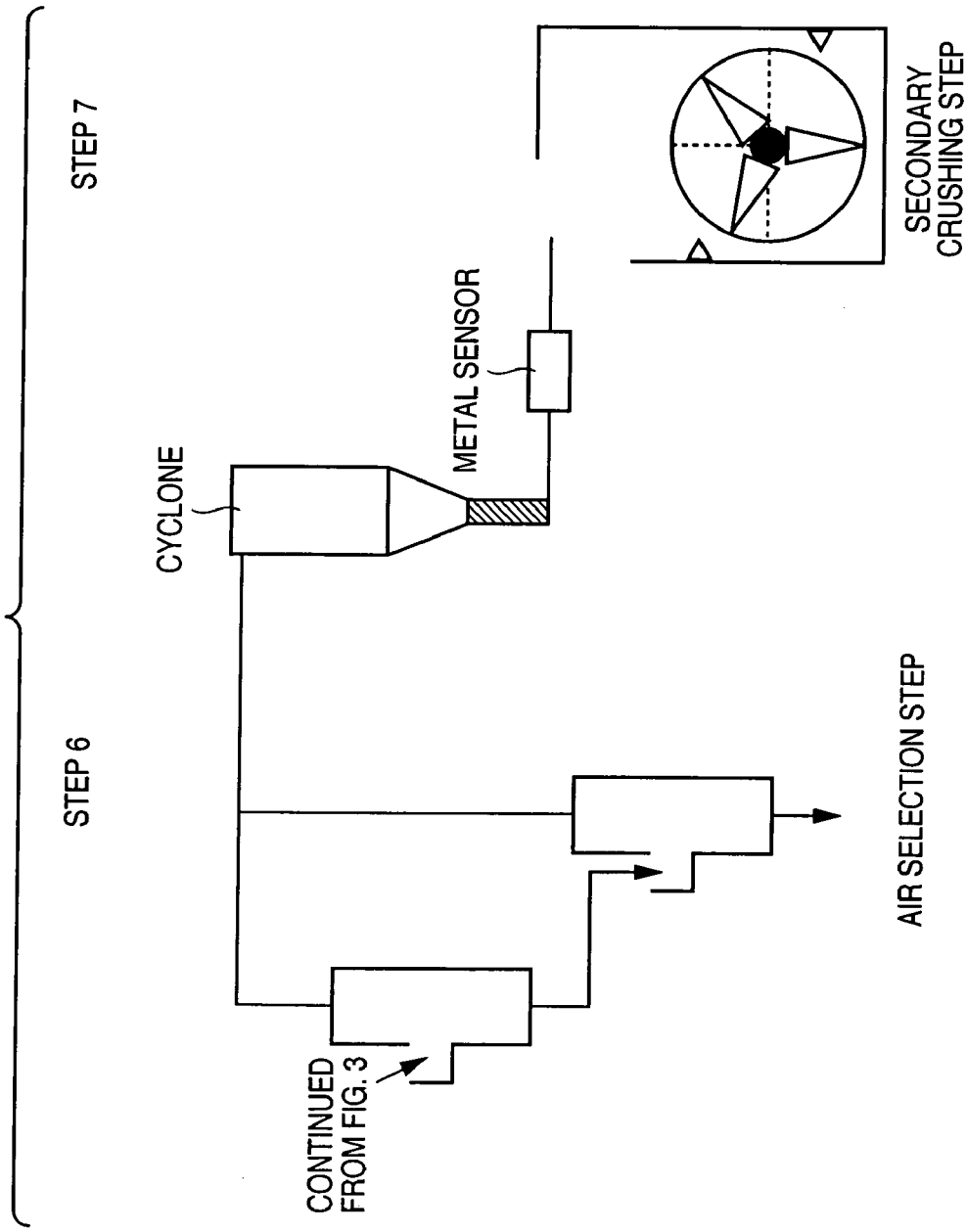
FIG. 4 is a view for explaining steps.

FIG. 4 shows steps 6 and 7.

Step 6 is an air selection step in which stainless steel parts and small metal parts are removed by air.

Step 7 is a secondary crushing step in which the crushed product subjected to the steps up to step 6 is further crushed more finely by a crushing apparatus.

Figure 5:
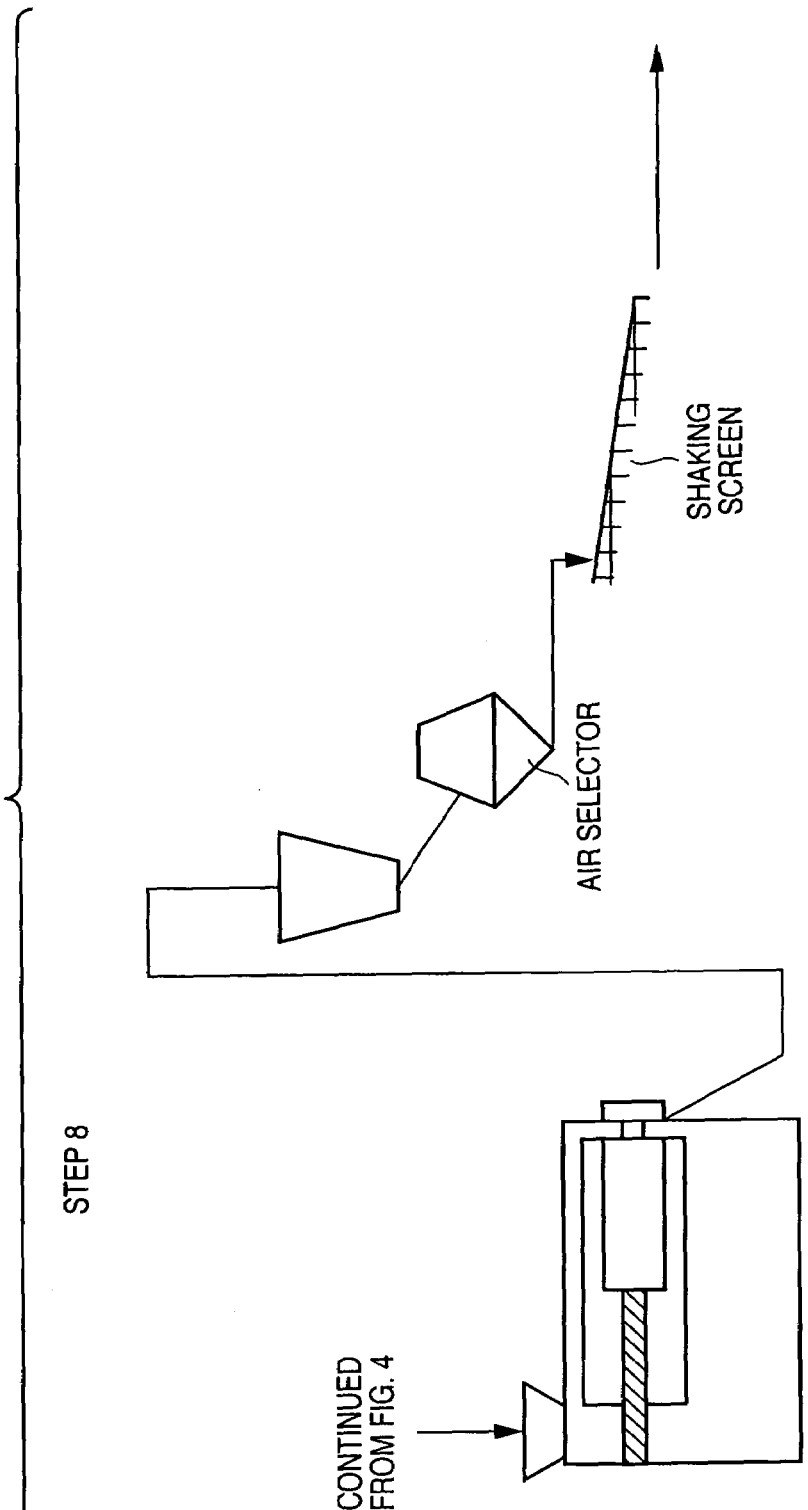
FIG. 5 is a view for explaining a step.

FIG. 5 shows step 8.

Step 8 is a peeling step for the crushed product subjected to the crushing operation in the secondary crushing step. In this step, labels, seals, and fine particles sticking to the plastic crushed product subjected to the processes such as crushing are separated by a peeling operation and air operation.

FIG. 6 shows steps 9 and 10.

Step 9 is a dry gravity separation step in which metals, polyethylene, and foamed urethanes are removed.

Step 10 is a color selection step.

In this color selection step, the crushed product subjected to the process in step S9 is placed in a hopper and then placed on a conveyor belt from the exit of the hopper. By adjusting the speed of the conveyor belt, the crushed product is placed on the conveyor belt so as to form a layer of the crushed product on the belt.

A large number of color selecting elements are arranged in the widthwise direction of the belt near its end position. In addition, compressing means are arranged in positions corresponding to these color selecting elements.

The crushed pieces as objects of selection placed on the belt are individually subjected to color selection by the color selecting means before the end portion of the belt.

Each color selecting element reads the color density of a crushed piece as an object of selection by a light emitting/receiving type color selecting operation, and sends the read color density to a selection control means which compares the color density with a reference color density.

In accordance with the comparison result, the selection control means operates a compressing means to spring out a crushed piece outside the reference density range, thereby selecting only crushed pieces within the reference density range.

Furthermore, in step 10, a metal sensing step is performed for the crushed pieces subjected to the color selection, thereby removing metals.

An important process in the above embodiment is the dry gravity separation step in step 9 before the crushed piece color selection step in step 10.

That is, the crushed pieces subjected to color selection in the color selection step are already crushed into very small pieces in the previous steps. Therefore, if these crushed pieces are not well dried before the color selection step, the crushed pieces adhere to each other. In this event, since crushed pieces having different colors adhere to each other, the degree of expectation of the selection performance of the color selecting elements decreases. In some cases, the color selection accuracy decreases.

Accordingly, it is important to maintain the crushed pieces in a well dried state before the color selection step.

Figure 7:
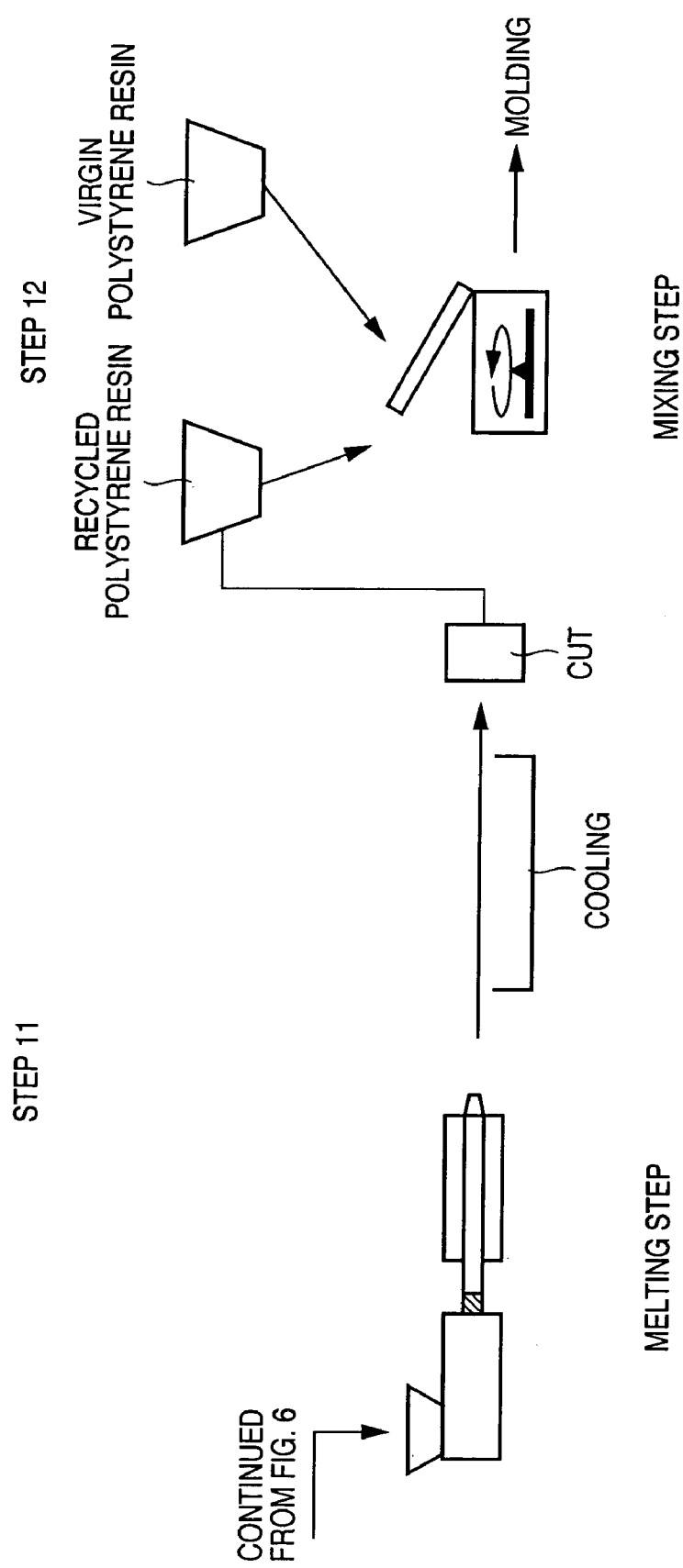
FIG. 7 is a view for explaining steps.

FIG. 7 shows steps 11 and 12.

In step 11, the crushed pieces processed in step 10 are melted, cooled, and cut to form a material of recycled plastic.

In step 12, the material of recycled plastic processed in step 11 is mixed with a new plastic material to form a recycled plastic material for molding.

Steps 11 and 12 may also be switched to first mix the recycled plastic pieces with a new plastic material, and then melt, cool, and cut the mixture to obtain a material of recycled plastic.

DESCRIPTION OF EXAMPLE

A process cartridge used in this example was a process cartridge of a laser beam printer manufactured and sold by the present applicant.

This cartridge is formed by using metals such as iron, aluminum, stainless steel, and copper, rubbers such as silicone rubber and urethane rubber, resins such as a styrene resin (PS), polyacetal resin (POM), polypropyrene (PP), polyethylene (PE), and polyethyleneterephthalate (PET), and a high-impact polystyrene resin (HIPS) as the material of parts particularly required to have flame retardance.

In the primary crushing step in step 1, crushing was performed by setting the crushing vessel volume (supply amount) to 10 to 20 kg, and rotating the blade at a rotating speed of 1,200 to 1,800 rpm while 10 to 30 seconds, while the oxygen concentration in the vessel was 10% or less.

The maximum length of large crushed pieces was 10 to 30 cm, and that of small crushed pieces was 1 to 5 cm.

In the screen selection step in step 2, screen selection was performed by setting the mesh value of the screen to 1 to 3 mm.

In the suspended magnetic selection step in step 3, an apparatus having a height of 180 mm and a magnetic force of 1,500 G(Gauss) was used.

In step 4, a drum magnetic selector removed iron members from the crushed product charged from the upper portion of the selector by rotating a magnet having a magnetic force of 5,000 G in a drum having a diameter of 500 mm or more.

In the eddy current step in step 5, aluminum was selected from the crushed product by combining a belt conveyor and a rotor using a permanent magnet having a magnetic force of 3,000 G or more.

In this step, aluminum members such as photosensitive drums and developing sleeves were removed.

An air selector in step 6 had a two-stage arrangement and was able to remove metal materials such as stainless steel.

In the secondary crushing step in step 7, a 7- to 13-mm screen was used to perform secondary crushing, thereby adjusting the particle size of the crushed pieces.

In step 8, the surfaces of the crushed pieces were polished to scrape off labels, seals, and adhesives from the surfaces.

Subsequently, an aspirator system was used to remove the scraped foreign matter and other foreign matter having a relatively small specific gravity such as toner and foamed urethane.

The aspirator system is an air selector by which particles diffused by a diffusion desk are separated by suction by a suction blower.

A dry gravity separator used in step 9 is an apparatus which separates materials having a large specific gravity from those having a small specific gravity by forward and backward motions of a mesh and by air blown from the lower portion. The separation performance can be adjusted by the inclination angle of the apparatus, the air amount, the frequency, and the type of mesh used.

In this dry gravity separation step, it was possible to remove metals such as iron, stainless steel, and copper as materials having a large specific gravity, and materials such as polyethylene and foamed urethane as materials having a small specific gravity.

In step 10, a color separator was used to remove colored resins having a reflection density of less than 1.00, a milk white polyacetal resin, urethane rubber, silicone rubber, and the like.

In this apparatus, two charge-coupled devices (CCD) are arranged in each of the upper and lower portions of the end portion of a 600-mm wide conveyor belt. Color selection is performed for crushed pieces while these crushed pieces are flying as they are conveyed by the conveyor belt.

FIG. 8 is a table showing the results of measurements of the reflection densities of crushed pieces in this example.

Referring to FIG. 8, a "COLOR" column indicates the type of color. HIPS as a plastic resin material used in a process cartridge is classified into black 1, black 2, black 3, or gray 1 in accordance with the value of reflection density.

The results of measurements of the reflection densities of crushed pieces having different colors were as shown in FIG. 8.

As shown in FIG. 8, plastic pieces include crushed pieces in blue (polypropylene, PP), green (polypropylene, PP), vermilion (ABS), and milk white 1 and milk white 2 (polyacetal resin, POM).

Note that a Macbeth reflection densitometer was used as the apparatus for measuring the reflection density of a crushed piece in this example.

In this example, a reflection density of 1.00 or more was set as a selection range.

A measurement value from a color selecting element corresponding to a crushed piece to be measured is supplied to a control means and compared with the selection range described above. If the measurement value falls outside the selection range, this crushed piece is sprung out by compressed air from an air spray nozzle of a compressing means corresponding to the color selecting element which has measured the crushed piece.

Crushed pieces whose measurement values fall within the selection range are collected in an accumulation vessel positioned at the end portion of the conveyor belt.

The color selection step described above was a very efficient method capable of removing, with high accuracy, resin crushed pieces and foreign matter from HIPS crushed pieces used in the process cartridge of this example.

To remove metals and rubbers slightly remaining in the above HIPS, to allow smooth molding, and to enable easy mixing with a virgin HIPS resin, in the melting step the HIPS was extruded into the same shape as new HISP pellets at an extrusion temperature of 180° C., a screw rotating speed of 300 rpm, and a discharge amount of 100 Kg/hr.

In the subsequent mixing step, new HIPS pellets and recycled HIPS pellets were mixed half-and-half.

After this mixing step, process cartridges were molded in accordance with the process cartridge molding step.

FIG. 9 shows the results of comparison of test items performed for HIPS molded portions of resin materials of process cartridges, i.e., performed for process cartridge parts A molded by new HIPS and process cartridge parts B molded by using recycled HIPS selected by the plastic material recycling method according to the present invention.

Note that the compared molded parts were drum shutter members.

As can be understood from the comparison results shown in FIG. 9, almost no differences were found in any test items.

As a consequence, the effect of the present invention as a recycled process cartridge part was confirmed.

In this embodiment, it was possible to implement material recycling by which a desired plastic material was selectively extracted from a plastic product obtained by molding a plastic resin material, and efficiently recycled into the same plastic product.

The present invention is not limited to the above embodiments and various changes and modifications can be made within the spirit and scope of the present invention. Therefore to apprise the public of the scope of the present invention, the following claims are made.

What is claimed is:

1. A method of recycling a plastic material of a process cartridge including metal materials, toner particles, and plastic materials of at least two different colors, said method comprising the steps of:
   crushing the process cartridge while collecting toner particles on the process cartridge by suction in a first crushing step;
   removing metal materials from the crushed pieces of the process cartridge in a magnetic selection step;
   adjusting the size of the crushed pieces in a secondary crushing step;
   collecting remaining toner particles on the size-adjusted crushed pieces in an air selection step;
   separating the plastic materials from the size-adjusted crushed pieces in a dry gravity separation step; and
   separating a plastic material having a specific reflection density from the other plastic materials of the size-adjusted, crushed plastic materials, separated from the remaining toner particles, in a color selection step.

2. The method according to claim 1, wherein the plastic materials are conveyed in a dried state in said color selection step.

3. The method according to claim 1, wherein the reflection density of the plastic material separated in said color selection step is not less than 1.00.

* * * * *